(12) United States Patent
Park (10) Patent No.: US 10,281,339 B2
(45) Date of Patent: May 7, 2019

(54) TERMINAL BOARD FOR TEMPERATURE COMPENSATION OF THERMOCOUPLE

(71) Applicant: AUTONICS CORPORATION, Busan (KR)

(72) Inventor: Hwan Ki Park, Busan (KR)

(73) Assignee: AUTONICS CORPORATION, Busan (KR)

( * ) Notice: Subject to any disclaimer, the term of this patent is extended or adjusted under 35 U.S.C. 154(b) by 209 days.

(21) Appl. No.: 15/319,165

(22) PCT Filed: Aug. 10, 2015

(86) PCT No.: PCT/KR2015/008324
§ 371 (c)(1),
(2) Date: Dec. 15, 2016

(87) PCT Pub. No.: WO2016/024767
PCT Pub. Date: Feb. 18, 2016

(65) Prior Publication Data
US 2017/0131151 A1 May 11, 2017

(30) Foreign Application Priority Data
Aug. 12, 2014 (KR) ................. 10-2014-0104680

(51) Int. Cl.
*G01K 1/00* (2006.01)
*G01K 7/00* (2006.01)
(Continued)

(52) U.S. Cl.
CPC ............ *G01K 1/20* (2013.01); *G01K 1/14* (2013.01); *G01K 7/02* (2013.01)

(58) Field of Classification Search
USPC .................... 377/208, 179; 374/208, 179
See application file for complete search history.

(56) References Cited

U.S. PATENT DOCUMENTS 6,020,824 A 2/2000 Tamura et al.

FOREIGN PATENT DOCUMENTS

JP 53032781 A * 3/1978
JP 7-209095 A 8/1995
(Continued)

*Primary Examiner* — Mirellys Jagan
(74) *Attorney, Agent, or Firm* — Birch, Stewart, Kolasch & Birch, LLP (57) ABSTRACT

The present invention provides a terminal board for temperature compensation of a thermocouple, the terminal board comprising: ⊏ -shaped terminal unit for connecting a compensation lead wire of the thermocouple to a PCB contact terminal connected to a control circuit of a circuit board so as to allow accurate temperature compensation of the thermocouple, the terminal unit having a pair of curved connection pins; a small-sized compensation sensor PCB which has a chip type temperature sensor for compensation at one end of the upper side thereof, an upper soldering surface which is soldered to a sensor pin unit for electrically connecting an output of the temperature sensor for compensation, and a lower soldering surface which is soldered to the terminal unit; and an L-shaped sensor pin unit for soldering the compensation sensor PCB together with the terminal unit, the sensor pin unit having a pair of rounded connection pins for contact-connection of the output of the temperature sensor for compensation to the temperature compensation sensor of the circuit board.

7 Claims, 7 Drawing Sheets

(51) Int. Cl.
*G01K 1/20* (2006.01)
*G01K 1/14* (2006.01)
*G01K 7/02* (2006.01)

(56) References Cited

FOREIGN PATENT DOCUMENTS

| | | |
|---|---|---|
| JP | 9-218108 A | 8/1997 |
| JP | 2001-124636 A | 5/2001 |
| JP | 2002-206970 A | 7/2002 |
| JP | 2010-8434 A | 1/2010 |

* cited by examiner

Prior Art

FIG. 7

Prior Art

TERMINAL BOARD FOR TEMPERATURE COMPENSATION OF THERMOCOUPLE

CROSS REFERENCE TO RELATED APPLICATIONS

This application is the National Phase of PCT/KR2015/008324 filed on Aug. 10, 2015, which claims priority under 35 U.S.C. § 119(a) to Patent Application No. 10-2014-0104680 filed in the Republic of Korea on Aug. 12, 2014, all of which are hereby expressly incorporated by reference into the present application.

BACKGROUND OF THE INVENTION

Field of the Invention

The present invention relates to a terminal board for thermocouple temperature compensation, which corrects a temperature error generated in the terminal board for connecting thermocouples in a thermostat and a thermometer and, more particularly, to a terminal board for thermocouple temperature compensation, which is capable of accurately compensating for a temperature by measuring a temperature at the terminal board connecting thermocouples and incorporating the measured temperature in a measured temperature of the thermocouple.

Discussion of the Related Art

A thermocouple is a sensor for detecting a temperature value using a thermoelectromotive force generated in proportion to a temperature difference at a joint part at which two type of different metal are jointed. Hereinafter, the metal joint part is called a temperature detector, and two different metal lines connected in the temperature detector are called compensation conductors. The thermocouple is placed at the place where a temperature is to be measured by the temperature detector, and measures a temperature. The two compensation conductors are connected to the terminal board of a thermostat or thermometer and measure a temperature.

When the compensation conductors are connected to the terminal board, a thermoelectromotive force proportional to a temperature of the terminal board is generated because a metal material for the terminal board and a metal material for the compensation conductors are different. Accordingly, a temperature error is generated because the temperature measured by the temperature detector is reduced by the temperature of the terminal board. In general, in order to compensate for such a temperature error, a separate temperature compensation sensor for measuring a temperature at the terminal board to which the compensation conductor of the thermocouple is connected. A temperature error is compensated for by adding the temperature of the terminal board.

In a conventional technology, it is technically difficult to attach the temperature compensation sensor to the terminal board. For this reason, a temperature measured by the thermocouple is corrected in such a way as to attach the temperature compensation sensor to a specific location of a circuit board within the casing of the thermostat and thermometer, to measure a temperature at the attached location, and to add or subtract a difference between a measured compensation temperature value and the temperature value measured by the thermocouple.

However, the conventional technology has a problem in that a temperature error is increased because the temperature compensation sensor is far spaced part from the location of the terminal board to which the compensation conductor is connected.

Figure 7:
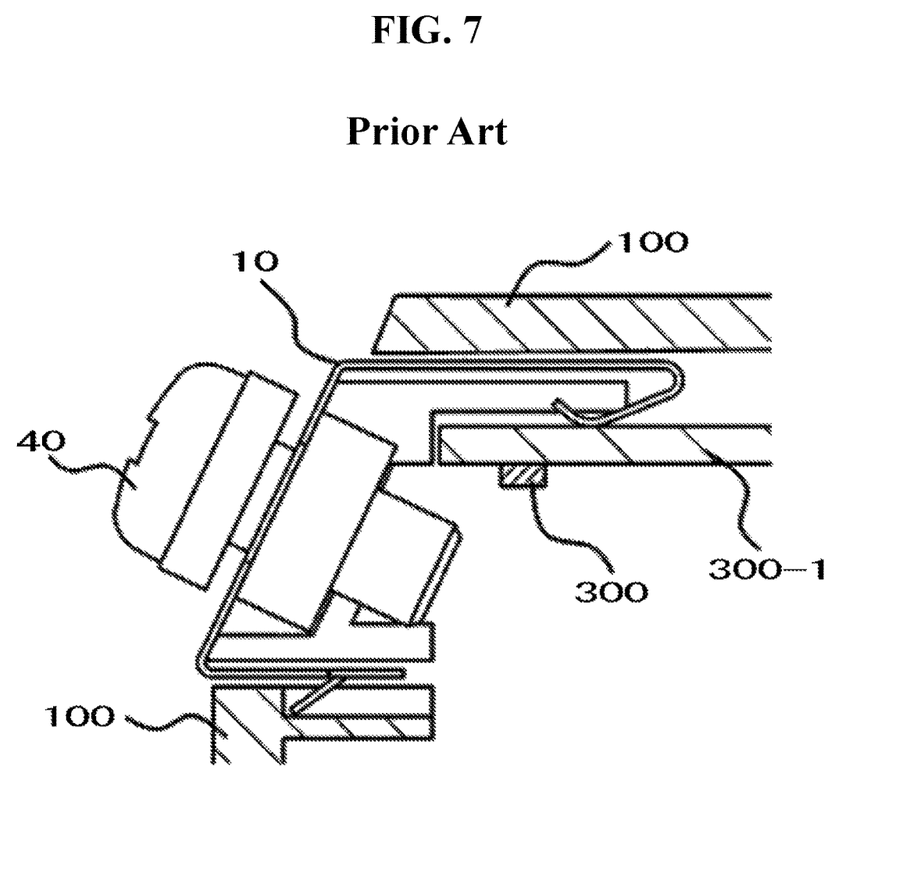
FIG. 7 is a perspective view showing the structure of another conventional terminal board.

In order to solve such a problem, as shown in FIG. 7, when a circuit board 300-1 is designed, a temperature compensation sensor 300 is disposed close to a terminal board. In this case, a temperature error is generated between a temperature at the terminal board to which a compensation conductor is connected and a temperature measured by the temperature compensation sensor 300 due to heat generated from the circuit board 300-1 itself and heat generated from the inside of a casing 100. After power is supplied to a thermometer, a temperature within the thermometer rises over time. Accordingly, an error value varies over time due to a temperature difference between a temperature at the terminal board to which the compensation conductor is connected and a temperature measured by the temperature compensation sensor, thereby making it difficult to correct a temperature measured by the thermocouple.

Figure 6:
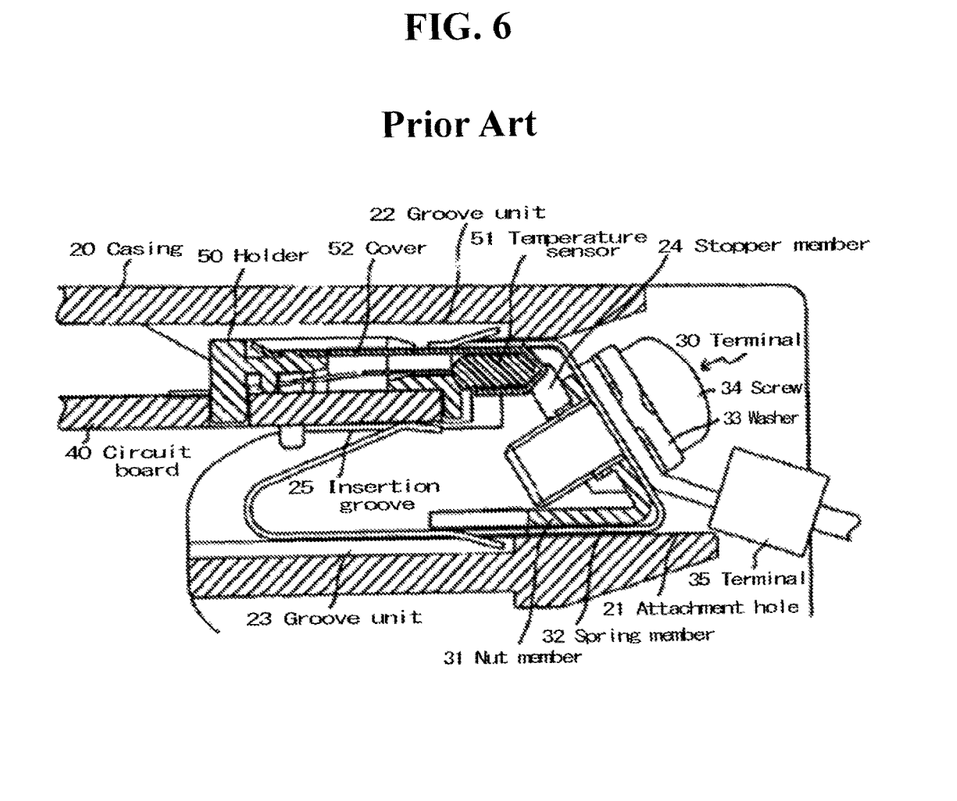
FIG. 6 is a perspective view showing the structure of a conventional terminal board.

In order to solve the difficulty, as shown in FIG. 6, Japanese Patent Application Publication No. 1997-218108 discloses a structure, including a holder 50 capable of being reduced in size, disposed in a circuit board 40 so that accurate temperature compensation can be performed, and adapted to prevent the thermal conduction of the circuit board 40 and a temperature compensation sensor 51 fixed to the holder 50, wherein the temperature compensation sensor is covered with a cover 52 made of a material having excellent thermal conduction so that the temperature compensation sensor 51 is disposed close to a terminal board to which a compensation conductor is connected as much as possible. However, the disclosed structure is problematic in that the structure is complicated, and a manufacturing cost and a process are increased because a fixing member for fixing the temperature compensation sensor must be separately fabricated.

Furthermore, there is a possibility that a temperature error may occur due to heat generated from the inside of a casing 20 because the temperature compensation sensor 51 is disposed within the terminal board installed in the casing 20. Furthermore there is a problem in that a temperature error is increased if the cover 52 covering the temperature compensation sensor 51 does not well come into contact with the terminal board due to the deformation of the terminal board, the casing 20, and the holder 50 because the terminal board and the temperature compensation sensor come into contact with each other.

PRIOR ART DOCUMENT

Patent Document (Patent Document 1) Japanese Patent No. 3161317 discloses a technology regarding a thermocouple temperature compensation structure.

SUMMARY OF THE INVENTION

Accordingly, the present invention has been made keeping in mind the above problems occurring in the prior art, and an object of the present invention is to provide a terminal board for thermocouple temperature compensation, which has a simple structure and is capable of accurate temperature compensation.

In an aspect, a terminal board for thermocouple temperature compensation includes:

a terminal unit curved in a "⊏" shape and adapted to have free end portions on upper and lower sides and to comprise a pair of connection pins curved for connection between the compensation conductor of a thermocouple and a contact terminal connected to the control circuit of a circuit board in the free end portion on the upper side;

a small-sized compensation sensor PCB adapted to have a temperature compensation sensor of a chip form mounted on one end on a top surface of the compensation sensor PCB and fixed to the top surface of the terminal unit so that the temperature compensation sensor is placed on the exposure portion side of the terminal unit; and a sensor pin unit fixed on the top surface of the compensation sensor PCB through soldering and having a pair of connection pins curved for connection between output of the temperature compensation sensor and the temperature compensation circuit of the circuit board, wherein the temperature compensation sensor is disposed close to a connection unit between the compensation conductor and the terminal unit, thereby minimizing the influence of heat generated within a casing, reducing a temperature error, and enabling accurate temperature measurement.

DETAILED DESCRIPTION OF THE EMBODIMENTS

An embodiment of the present invention is described with reference to the accompanying drawings in order for the present invention to be fully understood. The embodiment of the present invention may be modified in various forms, and the range of right of the present invention should not be construed as being limited to the following exemplary embodiment. The embodiment of the present invention is intended to fully describe the present invention to a person having ordinary skill in the art. Accordingly, the shapes, etc., of elements in the drawings may have been enlarged in order to highlight a more full description. It is to be noted that the same reference numerals are used to denote the same elements in the drawings. Furthermore, a detailed description of the known functions or constructions that may make the gist of the present invention is omitted.

Figure 1:
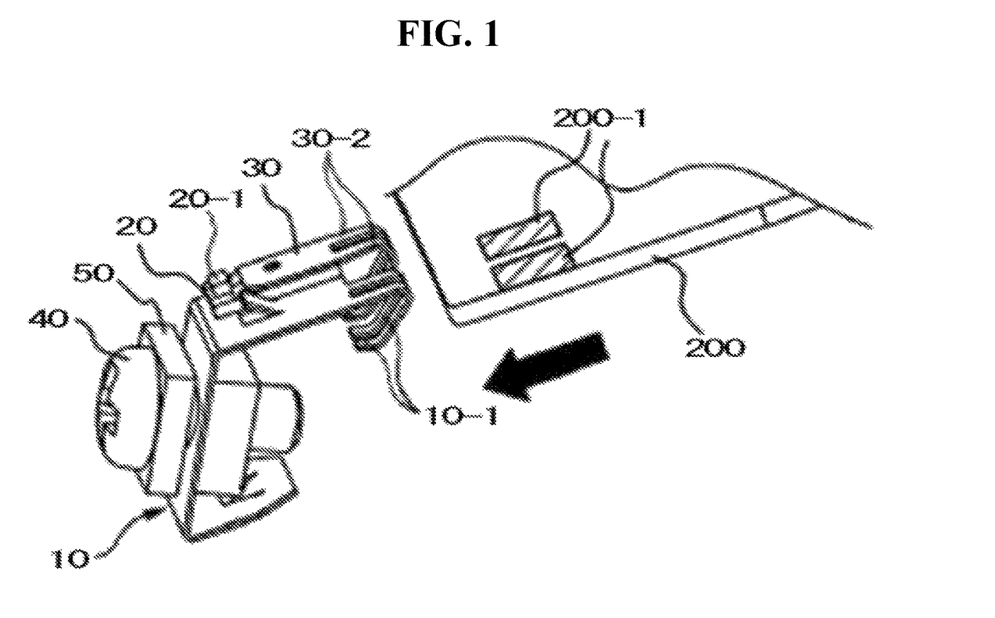
FIG. 1 is an overall perspective view of a terminal board for thermocouple temperature compensation according to an embodiment of the present invention.

As shown in FIG. 1, a terminal board for thermocouple temperature compensation according to an embodiment of the present invention includes a screw 40 and washer 50 for thermocouple compensation conductor connection, a terminal unit 10 curved in a "⊏" shape, a small-sized compensation sensor PCB 20, and a sensor pin unit 30. The terminal unit 10 has free end portions formed on the upper side and lower side of the terminal unit, respectively, and includes a pair of connection pins 10-1 disposed in the free end portion on the upper side and curved for a connection between the compensation conductor of a thermocouple and a PCB contact terminal 200-1 connected to the control circuit of a circuit board 200. The compensation-sensor PCB 20 includes a soldering surface 20-5 that is the bottom surface of the compensation sensor PCB 20 and that is fixed to a soldering surface 10-6 formed in the top surface of the free end portion on the upper side of the terminal unit 10 through soldering. The compensation sensor PCB 20 includes a temperature compensation sensor 20-1 of a chip form, which is mounted on one end on the top surface of the compensation sensor PCB 20. The sensor pin unit 30 has a compensation sensor PCB 20 stacked on the terminal unit 10 through soldering, and includes a pair of connection pins curved to connect output of the temperature compensation sensor 20-1 to the PCB contact terminal 200-1 connected to the temperature compensation circuit of the circuit board 200.

Figure 2:
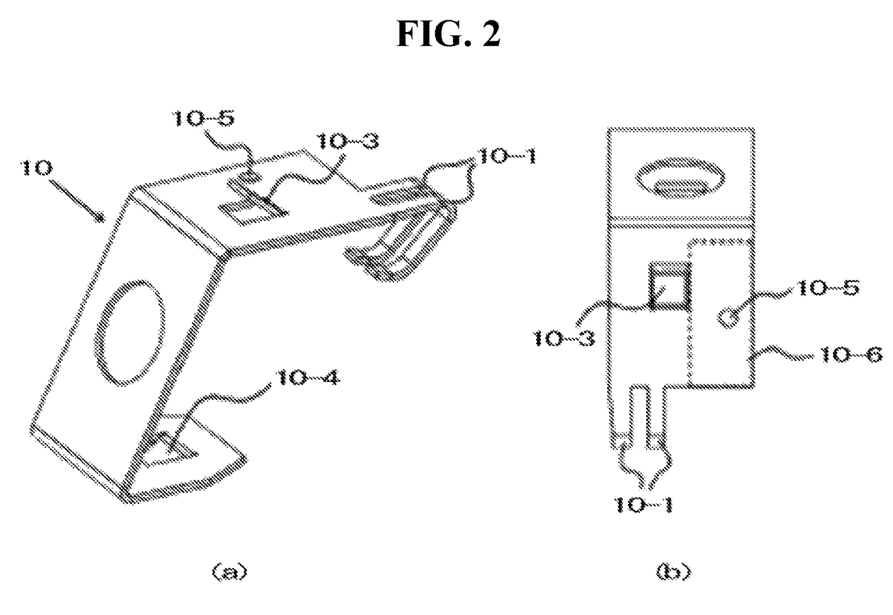
FIG. 2 is a perspective view showing a terminal unit for connecting thermocouple compensation conductors according to an embodiment of the present invention.

As shown in FIG. 2(a), the terminal unit 10 has a shape curved in a "⊏" form, and has the free end portions formed on the upper side and lower side thereof, respectively. Protruding pieces 10-3 and 10-4 for fixing the terminal unit 10 to a casing 100 and a guide hole 10-5 for guiding the position when the compensation sensor PCB 20 is stacked on the terminal unit 10 are formed in the free end portions, respectively. The terminal unit 10 includes the pair of connection pins 10-1 having an elastic force for providing an electrical contact with the PCB contact terminal 200-1 of the circuit board 200. Furthermore, the connection pins 10-1 have an elastic force, are curved downward and inward, and are stably connected to the PCB contact terminal 200-1 of the circuit board 200.

As shown in FIG. 2(b), the compensation sensor PCB 20 is soldered and fixed to the soldering surface 10-6 on the upper side of the terminal unit 10 through the soldering surface 20-5 on the lower side and electrically connected thereto.

Figure 3:
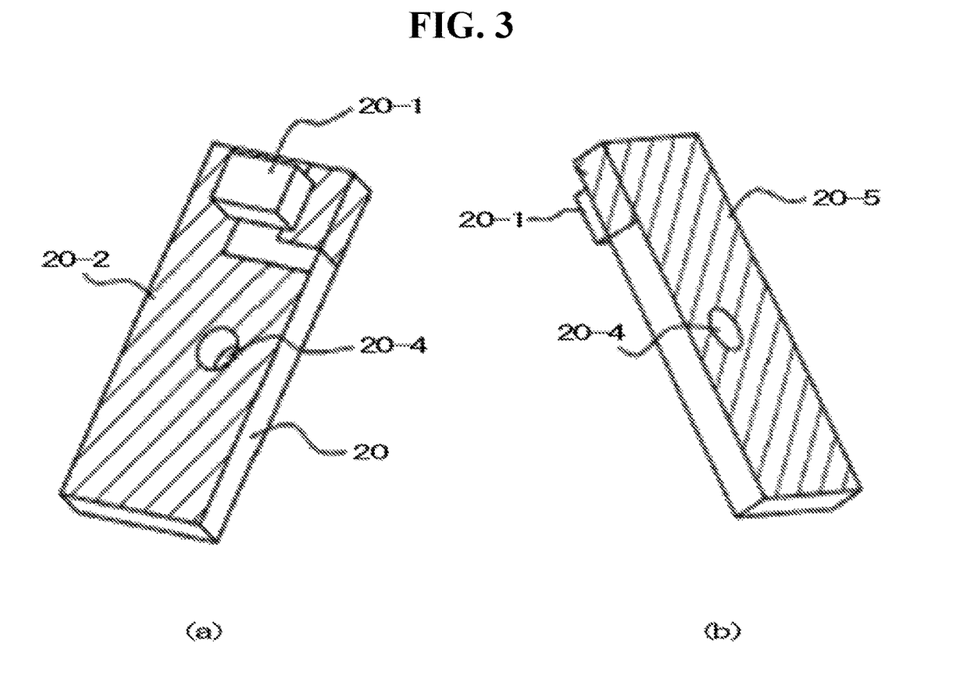
FIG. 3 is a perspective view showing a compensation sensor PCB according to an embodiment of the present invention.

As shown in FIG. 3, the compensation sensor PCB 20 includes a thin small-sized PCB having a rectangular form. The compensation sensor PCB 20 includes a guide hole 20-4 for guiding the position and adapted to be stacked with the terminal unit 10 and the sensor pin unit 30, the temperature compensation sensor 20-1 attached to the top surface thereof through soldering, a soldering surface 20-2 for sending a signal from the temperature compensation sensor 20-1 and also fixed to the bottom surface of the sensor pin unit 30 through soldering, and the soldering surface 20-5 for electrical connection with the terminal unit 10 and fixed to the soldering surface 10-6 placed on the upper side of the terminal unit 10. In order to increase a transfer coefficient of a temperature of the terminal unit 10, the front lower surface of the soldering surface 20-5 is adapted to be fixed to the soldering surface 10-6 of the terminal unit 10 through soldering.

Figure 4:
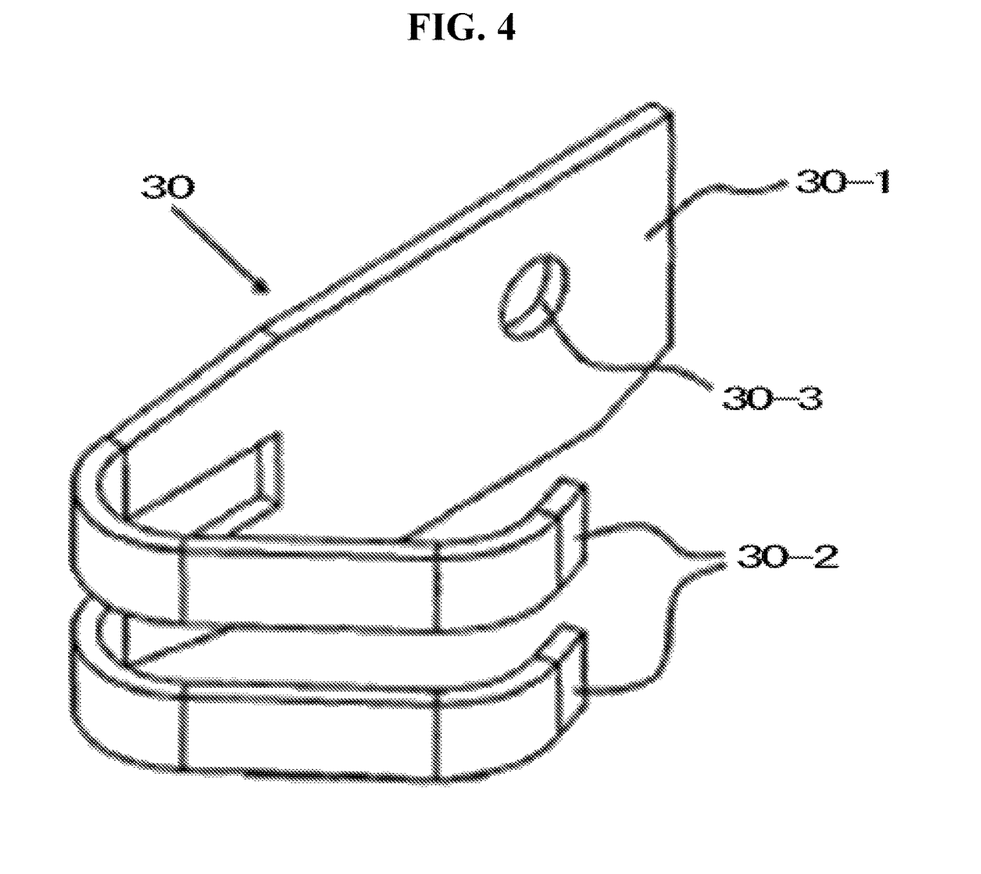
FIG. 4 is a perspective view showing a sensor pin unit according to an embodiment of the present invention.

As shown in FIG. 4, the sensor pin unit 30 has a hook shape. The sensor pin unit 30 includes a guide hole 30-3 to be stacked on the compensation sensor PCB 20, a soldering surface 30-1 stacked on the top surface of the compensation sensor PCB 20 through soldering, and a pair of connection pins 30-2 curved, fixed through the soldering surface 30-1 through soldering, and adapted to have an elastic force for connecting output of the compensation sensor PCB 20 to the PCB contact terminal 200-1 connected to the temperature compensation circuit of the circuit board 200.

Furthermore, when the circuit board 200 is inserted into the casing 100, the connection pins 30-2 can be firmly brought into contact with the PCB contact terminal 200-1 of the circuit board 200 by the elastic force.

Figure 5:
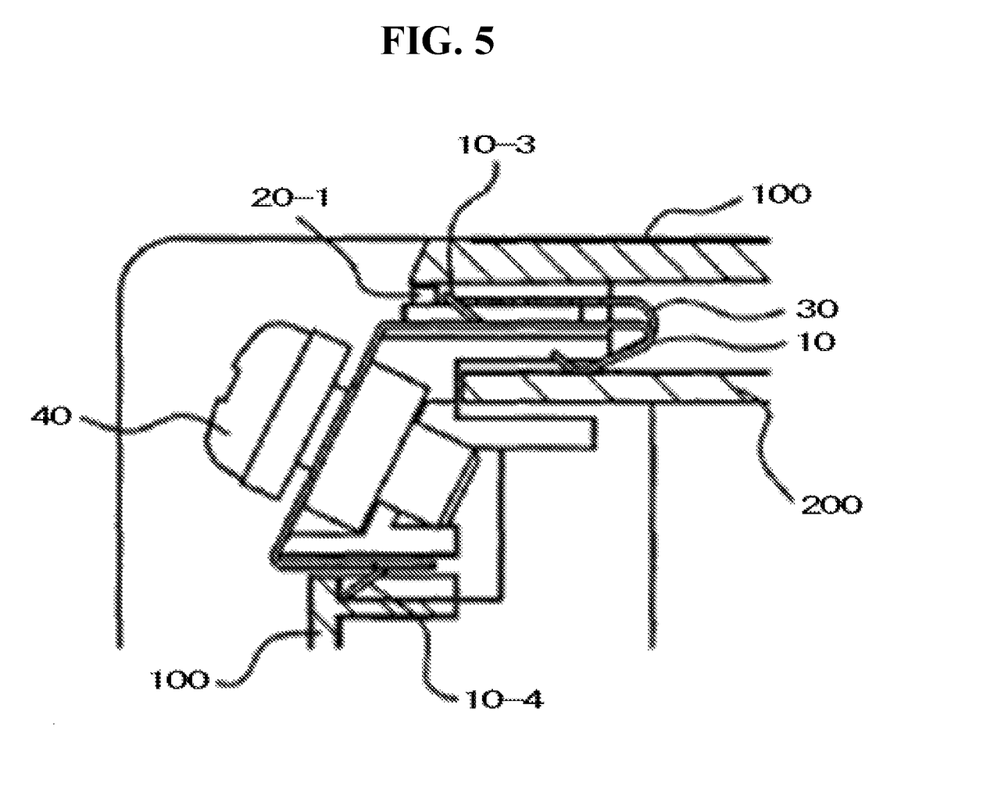
FIG. 5 is a cross-sectional view showing the state in which a terminal board has been disposed in a casing in accordance with an embodiment of the present invention.

FIG. 5 is a diagram showing the shape of a terminal board for thermocouple temperature compensation, which has been mounted on the casing 100. One side of the temperature compensation sensor 20-1 is disposed close to the outside the casing 100, thereby reducing the influence of heat internally generated within a device. Accordingly, a temperature error can be reduced, the structure can be simplified, and the size of a device in which a thermocouple, such as a temperature control device or a temperature measuring device, is used can be reduced.

In accordance with an embodiment of the present invention, the temperature compensation sensor is disposed close to the terminal board to which the compensation conductor of a thermocouple is connected as much as possible. Accordingly, there are advantages in that the influence of heat internally generated within a device in which the temperature compensation sensor is disposed can be minimized, a temperature error can be reduced, and a temperature measured by the thermocouple can be accurately compensated. Furthermore, there are advantages in that the size of a device can be reduced because a complicated unit for fixing the temperature compensation sensor is not required, maintenance and repair are easy, and a manufacturing cost and a process can be reduced.

The embodiment of the terminal board for thermocouple temperature compensation for an industrial temperature control and measuring device according to the present invention is only illustrative. A person having ordinary skill in the art to which the present invention pertains will easily understand that the present invention may be modified in various ways and that other equivalent embodiments are possible. Accordingly, it will be understood that the present invention is not limited to the embodiment described in the detailed description. Accordingly, the true range of protection of the present invention should be determined by the technical spirit of the following claims. Furthermore, it should be understood that the present invention includes all of changes, equivalents and substitutes without departing from the spirit and range of right of the present invention defined by the appended claims.

What is claimed is:

1. A temperature sensing device comprising:
   a casing;
   a circuit board positioned in the casing; and
   a terminal board coupled to the casing and electrically connected to the circuit board, wherein the terminal board comprises:
     a terminal unit curved several times and adapted to have free end portions formed on an upper side and a lower side of the terminal unit, respectively, and including a first connection pin curved from the free end portion on the upper side;
     a compensation sensor PCB stacked on a top surface of the free end portion on the upper side of the terminal unit;
     a temperature compensation sensor disposed on the compensation sensor PCB; and
     a sensor pin unit including a second connection pin connected to the compensation sensor PCB and curved.

2. The temperature sensing device of claim 1, wherein the first and the second connection pins are respectively connected to a plurality of PCB connection terminals formed on one surface of the circuit board.

3. The temperature sensing device of claim 1, wherein at least a part of the temperature compensation sensor is exposed outside the casing.

4. The temperature sensing device of claim 1, wherein:
   the compensation sensor PCB comprises a first conduction surface placed on a top surface of the compensation sensor PCB and connected to the sensor pin unit and a second conduction surface disposed on a bottom surface of the compensation sensor PCB, and
   the free end portion on the upper side and the temperature compensation sensor are electrically connected through the second conduction surface.

5. The temperature sensing device of claim 1, wherein guide holes formed at positions corresponding to each other are formed in at least two of the terminal unit, the compensation sensor PCB, and the sensor pin unit.

6. The temperature sensing device of claim 1, wherein protruding pieces for fixing the terminal unit to the casing are formed in the free end portion on the upper side and the free end portion on the lower side.

7. The temperature sensing device of claim 1, wherein the compensation sensor PCB comprises a conductor pattern for electrically connecting the temperature compensation sensor on the compensation sensor PCB and a second conduction surface which is a bottom surface of the compensation sensor PCB.

* * * * *